United States Patent
Sugitani et al.

(10) Patent No.: US 7,191,864 B2
(45) Date of Patent: Mar. 20, 2007

(54) STEERING DEVICE

(75) Inventors: Nobuo Sugitani, Saitama-ken (JP); Hitoshi Iwai, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 84 days.

(21) Appl. No.: 11/099,070

(22) Filed: Apr. 5, 2005

(65) Prior Publication Data

US 2005/0224276 A1   Oct. 13, 2005

(30) Foreign Application Priority Data

Apr. 8, 2004   (JP) .............................. 2004-114164

(51) Int. Cl.
  *B62D 5/00*   (2006.01)
(52) U.S. Cl. ...................... 180/402; 180/403
(58) Field of Classification Search ................ 180/402, 180/403; 701/41, 42, 43
  See application file for complete search history.

(56) References Cited

U.S. PATENT DOCUMENTS

| | | | |
|---|---|---|---|
| 5,247,441 A | | 9/1993 | Serizawa et al. |
| 5,908,457 A | * | 6/1999 | Higashira et al. .............. 701/41 |
| 6,059,068 A | * | 5/2000 | Kato et al. ................... 180/402 |
| 6,308,122 B1 | * | 10/2001 | Nishizaki et al. ............. 701/41 |
| 6,389,342 B1 | * | 5/2002 | Kanda .......................... 701/41 |
| 6,823,245 B2 | * | 11/2004 | Sugitani et al. ................ 701/29 |
| 6,859,704 B2 | * | 2/2005 | Aoki et al. .................... 701/41 |
| 6,886,656 B2 | * | 5/2005 | Fujioka et al. .............. 180/402 |
| 2004/0148077 A1 | * | 7/2004 | Yasui et al. ................... 701/41 |
| 2004/0211618 A1 | * | 10/2004 | Ogawa et al. .............. 180/402 |

FOREIGN PATENT DOCUMENTS

JP  2003-127886  5/2003

\* cited by examiner

*Primary Examiner*—Lesley D. Morris
*Assistant Examiner*—Marc A. Scharich
(74) *Attorney, Agent, or Firm*—Carrier, Blackman & Associates, P.C.; Joseph P. Carrier; William D. Blackman

(57) ABSTRACT

A steering device in which a steering wheel which a driver operates and wheels which are steered are not mechanically connected has a target turning angle determination device which determines a target turning angle of the wheels according to an operation amount of the steering wheel, a turning angle sensor which measures an actual turning angle of the wheels, a steering motor which turns the wheels according to a deviation between the target turning angle and the actual turning angle, a target steering reaction force setting section which determines a steering reaction force to be applied to the steering wheel, and a steering reaction force motor which applies the steering reaction force, in which a rate of increase of the steering reaction force is raised when the actual turning angle approaches a maximum turning angle.

12 Claims, 7 Drawing Sheets

STEERING DEVICE

BACKGROUND OF THE INVENTION

1. Field of the Invention

The present invention relates to a steering device with a constitution in which an operation unit operated by a driver and steerable wheels which are steered are not mechanically connected, and may be connectable from such a condition.

Priority is claimed on Japanese Patent Application No. 2004-114164, filed Apr. 8, 2004, the content of which is incorporated herein by reference.

2. Description of Related Art

In a so-called SBW (steer-by-wire) type steering device, there is no mechanical connection between the steering wheel (hereunder also referred to as the operation unit) steered by the driver, and the steerable wheels (the vehicle wheels). Therefore, greater output is required of the turning actuator which actually applies the turning angle to the steerable wheels, than in a conventional steering system in which the steering and the steerable wheels are linked mechanically, due to the fact that the steering effort of the driver applied to the steering wheel is not directly transmitted to the turning actuator.

Furthermore, in an SBW type steering device, the physical rack end position on the steerable wheels side cannot be felt at the steering wheel side by the driver. Therefore, it is necessary to make the driver aware of the so-called rack end bottoming, that is, the maximum turning angle.

One method of making the driver aware of the maximum turning angle is to rapidly build up the steering reaction force when the steering angle approaches the maximum steering angle, thereby letting the driver know when the turning angle reaches the maximum (for example, Patent Document 1: U.S. Pat. No. 5,247,441).

Incidentally, in the case of the SBW type steering device in which an electric motor is used in the turning actuator, there is a need for the output of the turning actuator to be as low as possible from the viewpoint of manufacturing costs and power consumption.

However, if the output of the motor is not sufficient, the driver may be unable to adequately turn the steerable wheels to the turning angle intended by the driver, that is the target turning angle determined according to the steering angle, so that the driver experiences a considerable feeling of unease. This feeling of unease is particularly marked at extremely low speeds where a large turning output is required, such as when parking, for example.

Furthermore, in Patent Document 1 mentioned above, if the steerable wheels do not adequately turn to the target turning angle, then during the time from when the steering wheel is turned to the maximum steering angle until the actual turning angle catches up to the maximum turning angle, the driver has to wait with the steering wheel kept at the maximum steering angle.

In order to solve this problem, it is also possible to prevent the driver from steering too quickly, by applying a steering reaction force corresponding to the deviation between the actual turning angle and the target turning angle (hereunder referred to as the turning angle deviation) to the steering wheel. However, if the turning actuator has insufficient motor output, there will always be a large turning angle deviation, and as a result, the driver's steering is constantly hampered by the large steering reaction force, and this lowers the quality of the product.

SUMMARY OF THE INVENTION

The present invention takes the above circumstances into consideration, and has an object of providing a steering device with which a driver can operate an operation unit without being conscious of the turning delay in the steerable wheels.

To solve the problems mentioned above, the present invention is a steering device with a constitution in which an operation unit which a driver operates (steers) and steerable wheels which are steered are not mechanically connected, and may be connectable from such a condition, having a target turning angle determination device which determines a target turning angle of the steerable wheels according to an operation amount of the operation unit, a turning angle measuring device which measures an actual turning angle of the steerable wheels, a turning actuator which turns the steerable wheels according to a deviation between the target turning angle and the actual turning angle, a reaction force determination device which determines a reaction force to apply to the operation unit, and a reaction force actuator which applies the reaction force, in which a rate of increase of the reaction force is raised when the actual turning angle approaches a maximum turning angle.

According to such a configuration, the steering reaction force does not rapidly build up until the actual turning angle is at least close to the maximum turning angle. Therefore, the driver is allowed to operate the operation unit as normal.

Furthermore, in the present invention, determination of the target turning angle may be changed according to the operation amount of the operation unit when the actual turning angle approaches the maximum turning angle.

If as described above, the steering reaction force does not rapidly build up until the actual turning angle is close to the maximum turning angle, occasionally the operation amount of the operation unit may exceed an initial setting. In such a situation, if the setting already determined for the target turning angle is left unchanged, the steerable wheels will not turn for a brief period when the driver applies a returning operation to the operation unit.

To address this, according to the configuration of the present invention, the previously determined target turning angle is changed according to the operation amount of the operation unit. Therefore, when the driver begins the returning action of the operation unit, the steerable wheels are able to turn without delay.

In the present invention, when the target turning angle approaches the maximum turning angle during a period where a deviation between the actual turning angle and the target turning angle is not less than a predetermined level, a preliminary reaction force, which is smaller than a reaction force applied when the actual turning angle approaches the maximum turning angle, may be applied to the operation unit.

According to such a configuration, during operation of the operation unit, the driver can be made aware when the operation amount of the operation unit has reached the original maximum turning angle.

According to the present invention, while the driver is operating the operation unit, the driver can continue the operation without being conscious of the tracking delay of the steerable wheels.

Furthermore, by temporarily increasing the steering reaction force at the stage when the target turning angle approaches the maximum turning angle, it is possible to suppress an increase in excessive amounts of steering caused by fast steering by the driver, and to suppress the rate of increase of the steering reaction force when the steerable wheels approach the maximum turning angle.

Methods of controlling the above described steer-by-wire steering device are provided. In a first method, the steering device is controlled such that when the difference between the actual turning angle and the target turning angle is less than a predetermined level, and when the target turning angle reaches a maximum turning angle, then the steering reaction force is rapidly increased, and when the difference between the actual turning angle and the target turning angle is greater than a predetermined level, and when the target turning angle reaches a maximum turning angle, then the steering reaction force remains substantially unchanged.

In an alternate method, the steering device is controlled such that when the operation unit is operated by the driver, the reaction force actuator applies an initial steering reaction force to the operation unit, the initial steering reaction force being substantially constant over time for an increasing actual turning angle. When the difference between the actual turning angle and the target turning angle is less than a predetermined level, and when the target turning angle reaches a maximum turning angle, then the steering reaction force is rapidly increased. In addition, when the difference between the actual turning angle and the target turning angle is greater than a predetermined level, and when the target turning angle reaches the maximum turning angle, then the steering reaction force is increased to a level of force which is greater than the initial steering reaction force and substantially maintained at that force level until the actual turning angle reaches the maximum turning angle, at which time the steering reaction force is rapidly increased.

DETAILED DESCRIPTION OF THE INVENTION

In the following, a first embodiment of a SBW (steer-by-wire) type steering device, which is a preferred embodiment of the present invention, is described with reference to FIG. 1 to FIG. 7.

Figure 1:
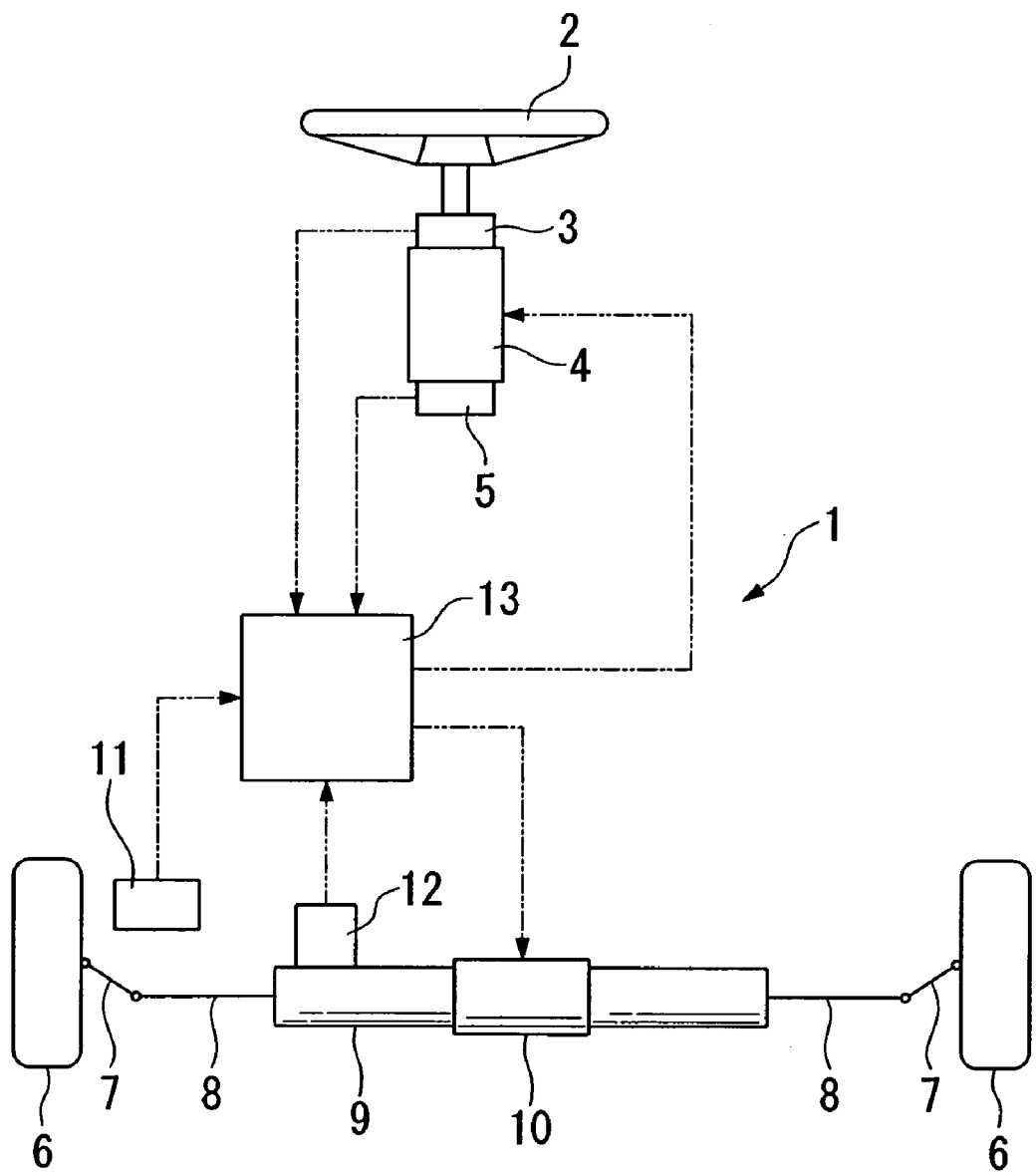
FIG. 1 is a schematic configuration diagram of a steering device according to one embodiment of the present invention.

As shown in FIG. 1, the steering device 1 has a steering wheel (operation unit) 2 steerable by a driver, a steering angle sensor 3 provided on the steering wheel 2, a steering reaction force application motor (reaction force actuator) 4, a steering torque sensor 5, a steering rod 9 connected to left and right wheels (steerable wheels) 6 via knuckle arms 7 and tie rods 8, a steering motor (turning actuator) 10 which drives the steering rod 9 in the axial direction and applies a turning angle to the wheels 6, a vehicle speed sensor 11 which outputs vehicle speed, a turning angle sensor (turning angle measuring device) 12 which outputs a turning angle for the wheels 6 from a position in the axial direction of the steering rod 9, and a control device 13 which controls the steering reaction force application motor 4 and the steering motor 10.

The steering wheel 2 is continuously urged towards a neutral position by a suitable spring mechanism or the like (not shown).

Figure 2:
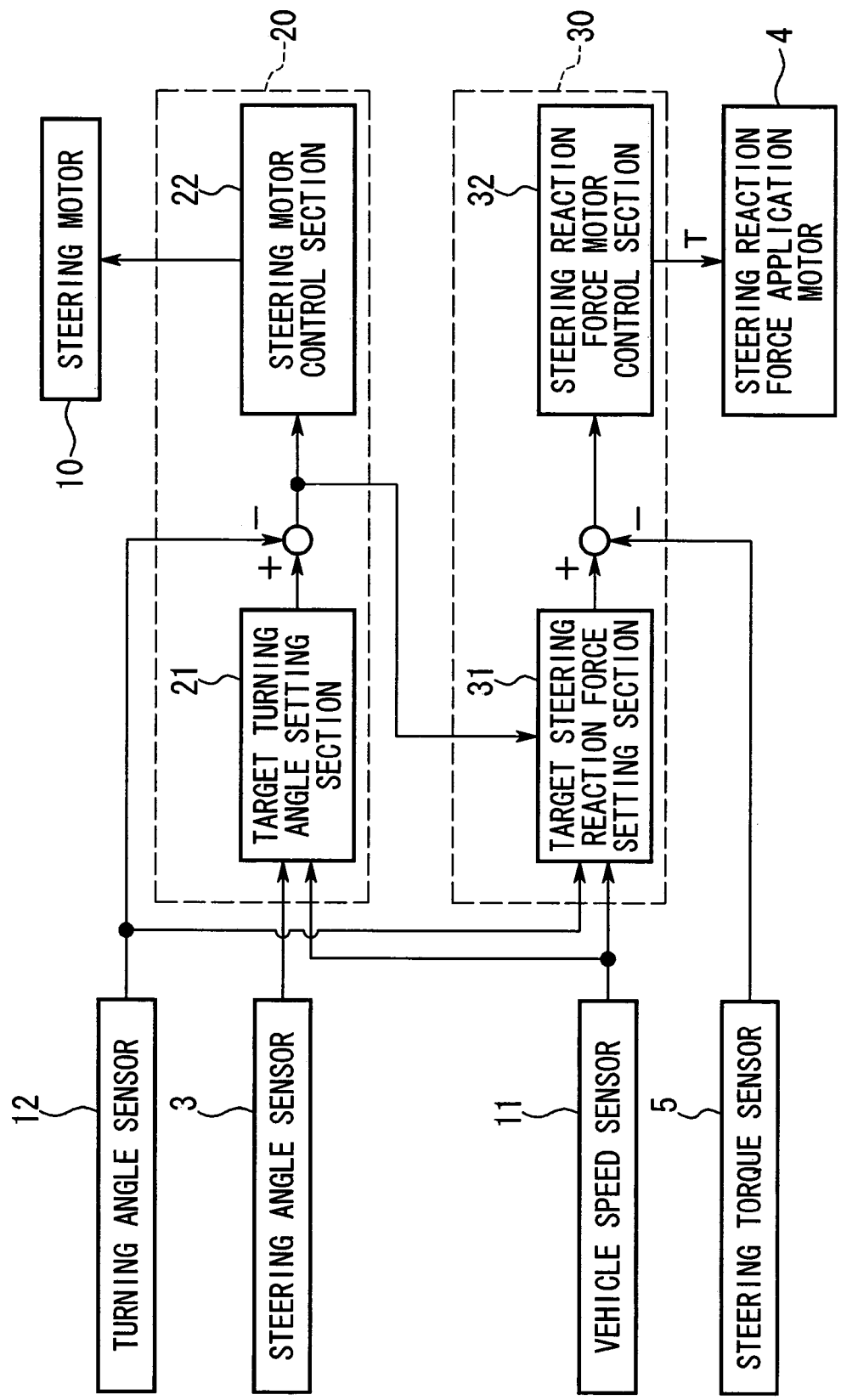
FIG. 2 is a control block diagram for the steering device.

As shown in the block diagram in FIG. 2, the control device 13 has a turning control section 20 which controls the steering motor 10 based on signals from the steering angle sensor 3, the vehicle speed sensor 11, and the turning angle sensor 12, and a steering reaction force control section 30 which controls the steering reaction force application motor 4 based on signals from the turning control section 20, the steering torque sensor 5, the vehicle speed sensor 11, and the turning angle sensor 12. The control device 13 is capable of controlling the steering reaction force application motor 4 and the steering motor 10 separately.

The turning control section 20 has a target turning angle-setting section (target turning angle-setting device) 21 which sets the target turning angle based on a steering angle signal which includes a steering direction of the steering wheel 2 from the steering angle sensor 3, and the vehicle speed signal from the vehicle speed sensor 11, and a steering motor control section 22 which controls the power supplied to the steering motor 10 so as to match the output value of the turning angle sensor 12, that is the actual turning angle of the wheels 6, to the target turning angle.

As a result, an optimum turning angle for the wheels 6 which takes into account the vehicle speed at the time is determined based on the steering angle (operation amount) applied to the steering wheel 2 by the driver.

The steering reaction force control section 30 has a target steering reaction force-setting section (reaction force determination device) 31 which sets the target steering reaction force based on the vehicle speed signal from the vehicle speed sensor 11, the turning angle signal from the turning angle sensor 12, and the steering angle command signal from the turning control section 20, and a steering reaction force motor control section 32 which controls the power supplied to the steering reaction force application motor 4 so as to match the output value of the steering torque sensor 5 (actual steering torque) to the target steering reaction force set in the target steering reaction force-setting section 31.

As a result, a steering reaction force is applied to the steering wheel 2 in the opposite direction to the steering direction of the driver, thereby giving the driver the feeling of steering as if the steering wheel 2 and the wheels 6 are directly connected.

Figure 6:
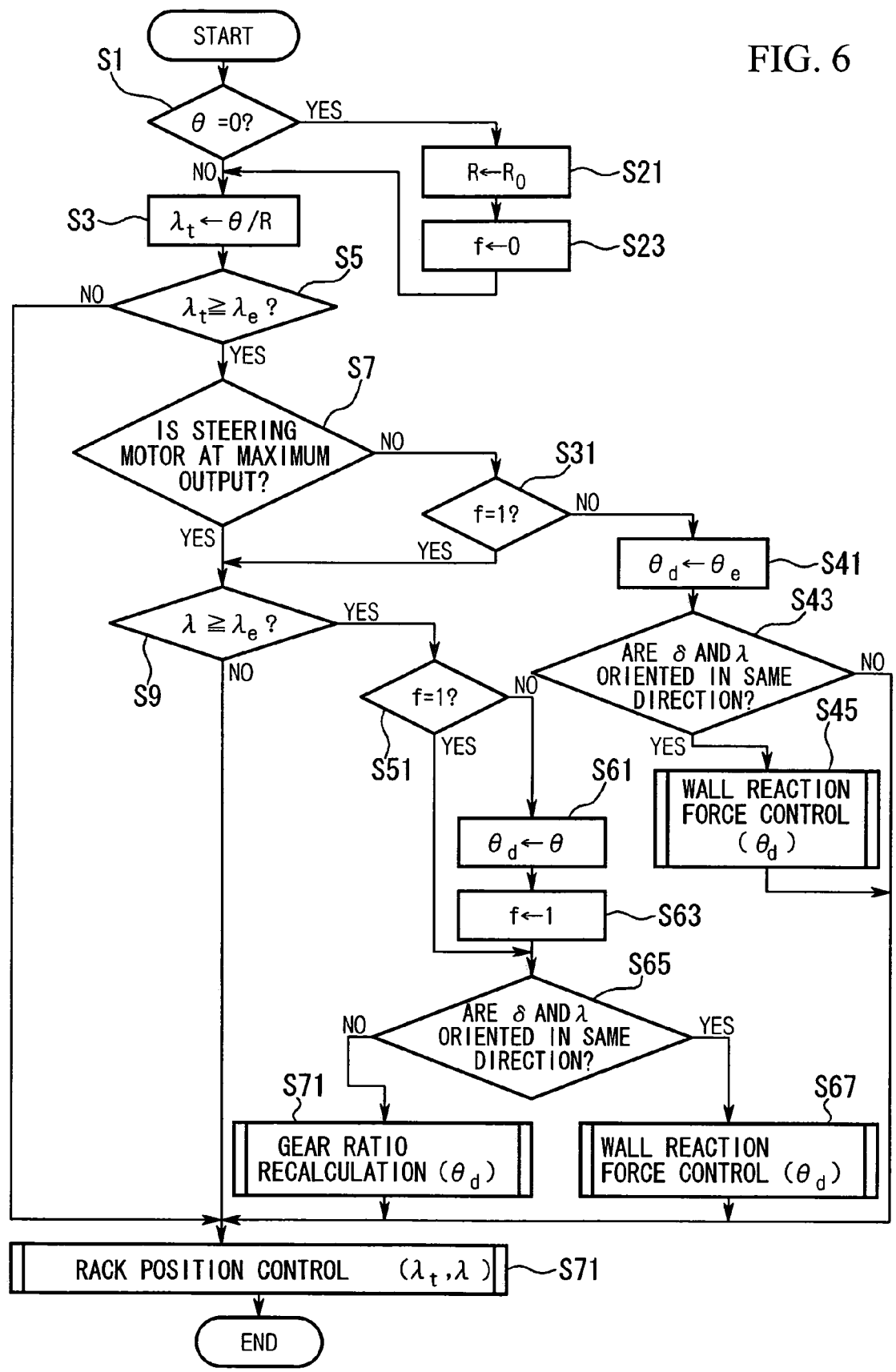
FIG. 6 is a flow chart showing the contents of the controlled rack end variable processing by the steering device.

In a state in which the actual turning angle adequately follows the target turning angle, when the target turning angle reaches the maximum value, that is, the target rack stroke reaches a rack stroke corresponding to the physical rack end position, the steering reaction force control section 30 performs wall reaction force control in which the steering reaction force is rapidly built up (see steps S5, S7, . . . , S45 in FIG. 6).

Figure 3:
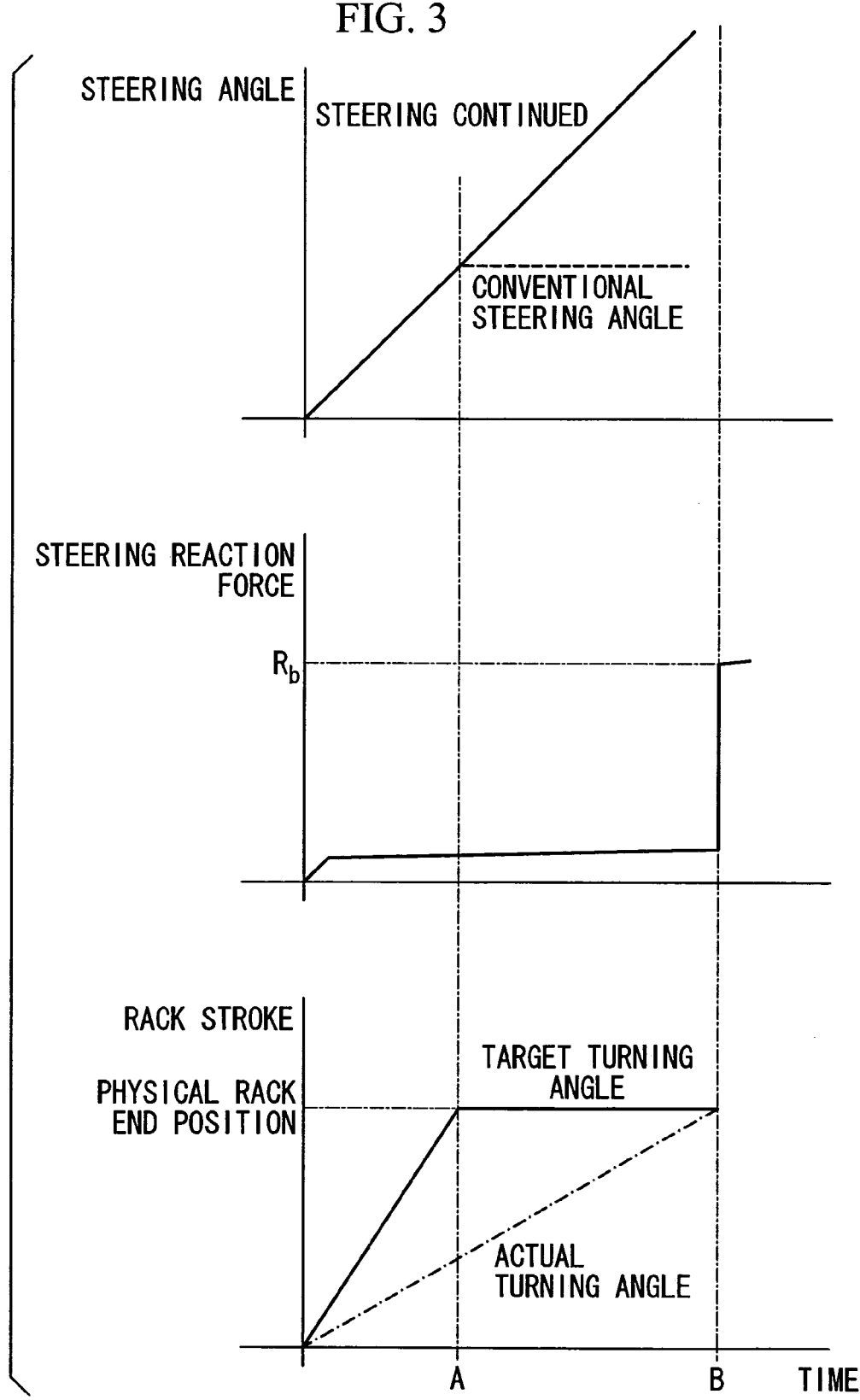
FIG. 3 is a timing chart showing a portion of controlled rack end variable processing by the steering device.

On the other hand, as shown in FIG. 3, in a state in which the actual turning angle (the dashed line) does not adequately follow the target turning angle (the solid line), that is a state in which the deviation between the actual turning angle and the target turning angle is above a predetermined value, then when the target turning value has already reached the maximum value (state A), in other words the actual turning angle has reached the control steering end angle, or again in other words the target rack stroke corresponding to the actual steering angle has reached a rack stroke corresponding to the physical rack end position despite the actual rack stroke not having reached the physical rack end position, the steering reaction force does not build up, and the driver is allowed to continue to steer the steering wheel 2 (see steps S5, S7, S9 and S11 in FIG. 6).

The driver continues to steer the steering wheel 2 as it is, and when the actual turning angle reaches the maximum turning angle (state B), that is, when the actual rack stroke reaches the physical rack end position, wall reaction force control is performed in which the steering reaction force is rapidly built up, making the driver aware that that position is the maximum turning angle (the rack end) (see steps S5, S7, S9, . . . , S67 in FIG. 6).

In other words, until the actual turning angle reaches the maximum turning angle, the driver is allowed to continue steering the steering wheel 2 unimpeded without the steering reaction force being built up. Therefore, even if the steerable wheels 6 continue to turn during that period, the feeling of unease experienced by the driver is greatly reduced.

In this wall reaction force control in which the steering reaction force is rapidly built up, if the steering reaction force applied until that point has been constant, a reaction force which is larger than that steering reaction force is built up, and if the reaction force applied until that time is a reaction force corresponding to the deviation between the steering angle and the actual turning angle, the rate of increase of the reaction force to that point (for example, the time derivative of the steering reaction force) is increased. In short, as a result of the steering reaction force being built up, the driver should be able to sense that no further steering in the same direction is possible.

Figure 4:
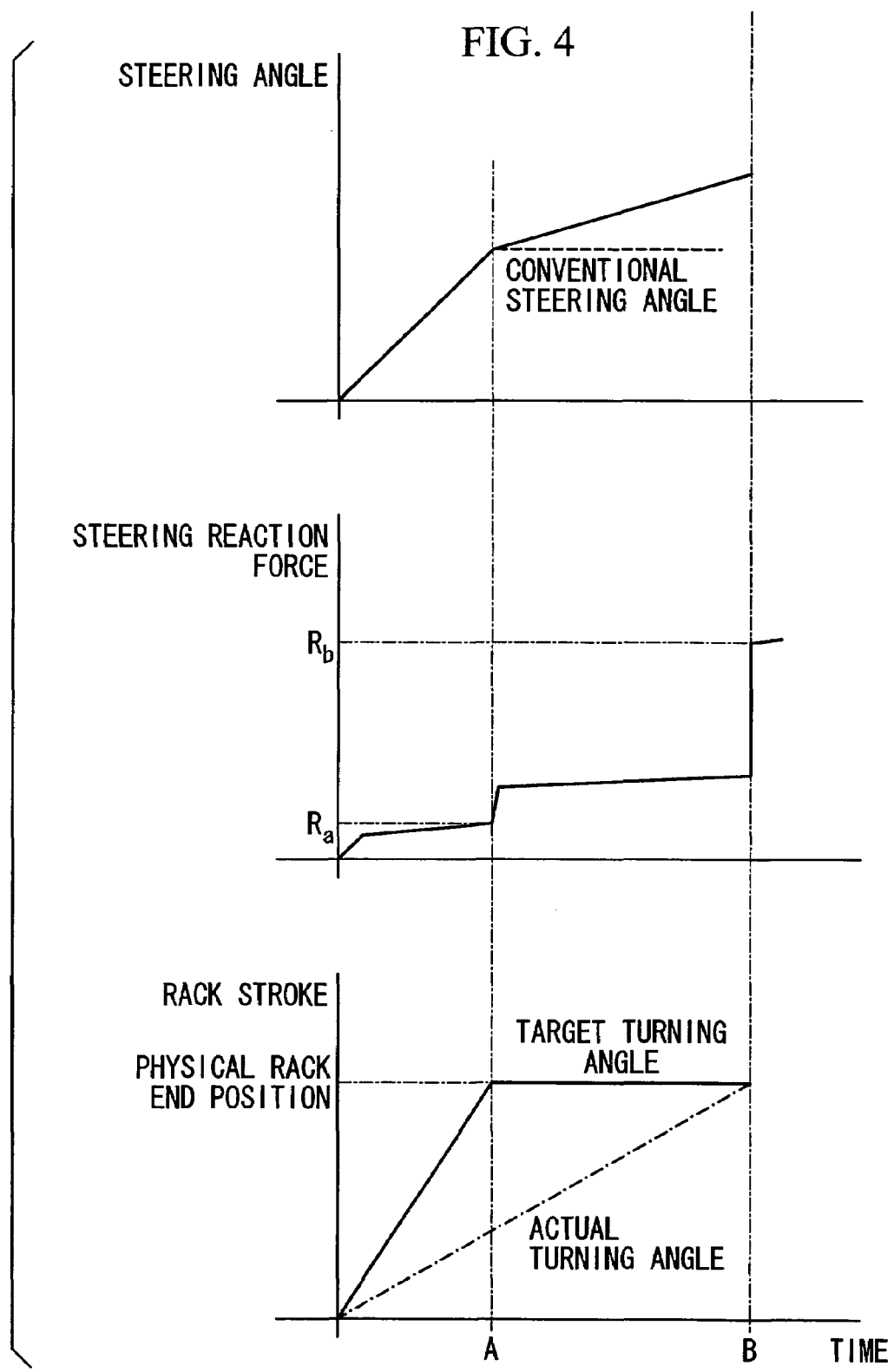
FIG. 4 is a timing chart showing a modified embodiment of the controlled rack end variable processing in FIG. 3.

Here, as shown in FIG. 4, preliminary wall reaction force control which preliminarily increases the steering reaction force by a small amount, may be performed when the target turning angle reaches the maximum turning angle (state A).

By performing this preliminary wall reaction force control, the driver steering the steering wheel 2 can be made aware that the steering angle has reached the angle corresponding to the original maximum turning angle, which encourages the driver to reduce the speed at which the driver steers the steering wheel 2.

As a result, it is possible to suppress the control amount (the rate of increase of the steering reaction force) during the wall reaction force control which is performed when the actual turning angle reaches the maximum turning angle (state B).

The steering reaction force which is preliminarily applied during the preliminary wall reaction force control is set to a suitable value which is smaller than the maximum steering reaction force Rb in state B, for example, an amount of increase comparable with the steering reaction force Ra immediately before state A is reached.

Figure 5:
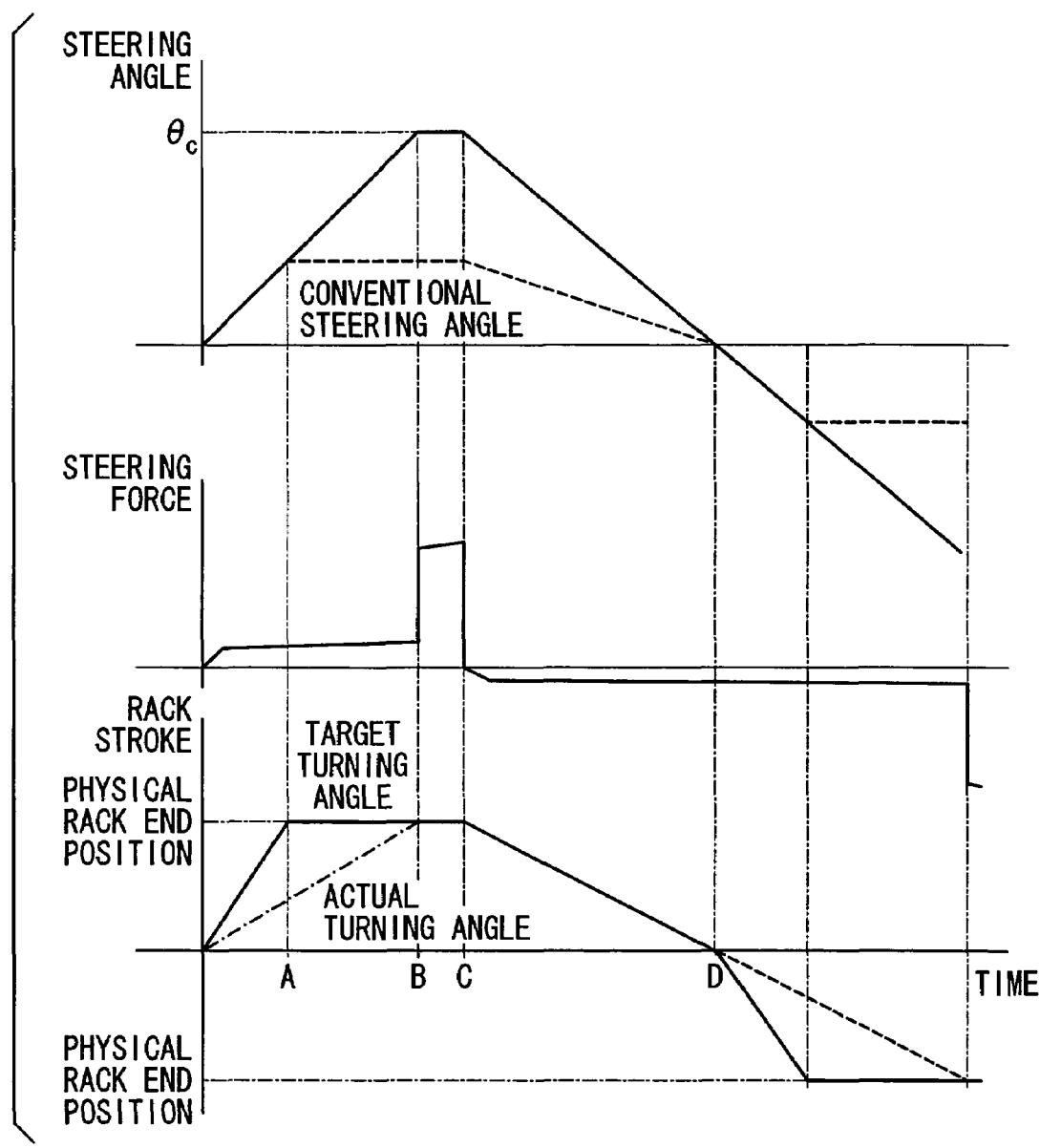
FIG. 5 is a timing chart showing the overall controlled rack end variable processing by the steering device.

As shown in FIG. 5, when the driver returns the steering wheel 2 (state C) after the target turning angle has reached the maximum turning angle (after state A), turning angle control is performed according to a new steering gear ratio, regardless of how well the actual turning angle is tracking the target turning angle (see steps S65, S71, and S11 in FIG. 6).

In other words, when the actual turning angle approaches the maximum turning angle (or matches it in the case of the present example), the target turning angle setting section 21 changes the previously determined target turning angle according to the actual steering angle θ of the steering wheel 2.

This is because if the setting of the steering gear ratio is not changed in this manner, then due to the excess steering of the steering wheel 2 being allowed, the wheels 6 do not turn during the period from when the steering wheel 2 starts to return until the excess steering amount has been taken up, and therefore, the driver would experience a feeling of unease.

This new steering gear ratio is a steering gear ratio wherein the actual steering angle θc at the position where the steering is returned (state C), that is the actual steering angle θc steered from the position where the turning angle is zero until the steering is returned is redefined as the new maximum steering angle.

After state C in FIG. 5, when the driver has continued to return the steering wheel 2, and the wheels 6 cross the position where the turning angle is zero (state D), the steering gear ratio which was changed to a different setting is restored to the initial setting (steps S1 and S21 in FIG. 6). In FIG. 5, the wavy line after state D shows the relationship between the target turning angle and the target rack stroke when the steering gear ratio is not restored to its original setting.

The steering reaction force applied when the degree of steering of the steering wheel 2 is increased or decreased may be controlled in a constant manner, or may be controlled in a variable manner according to the deviation between the steering angle and the actual turning angle.

Here, if the driver turns the steering wheel 2 excessively while the vehicle is traveling at normal speeds, the feeling of the steering may be more sluggish than the driver expects. Therefore, needlessly excessive steering of the steering wheel 2 by the driver may be prevented by reducing the effects of the turning angle control in accordance with the rise in vehicle speed, while at the same time raising the rate of increase of the steering reaction force in the preliminary wall reaction force control.

Figure 7:
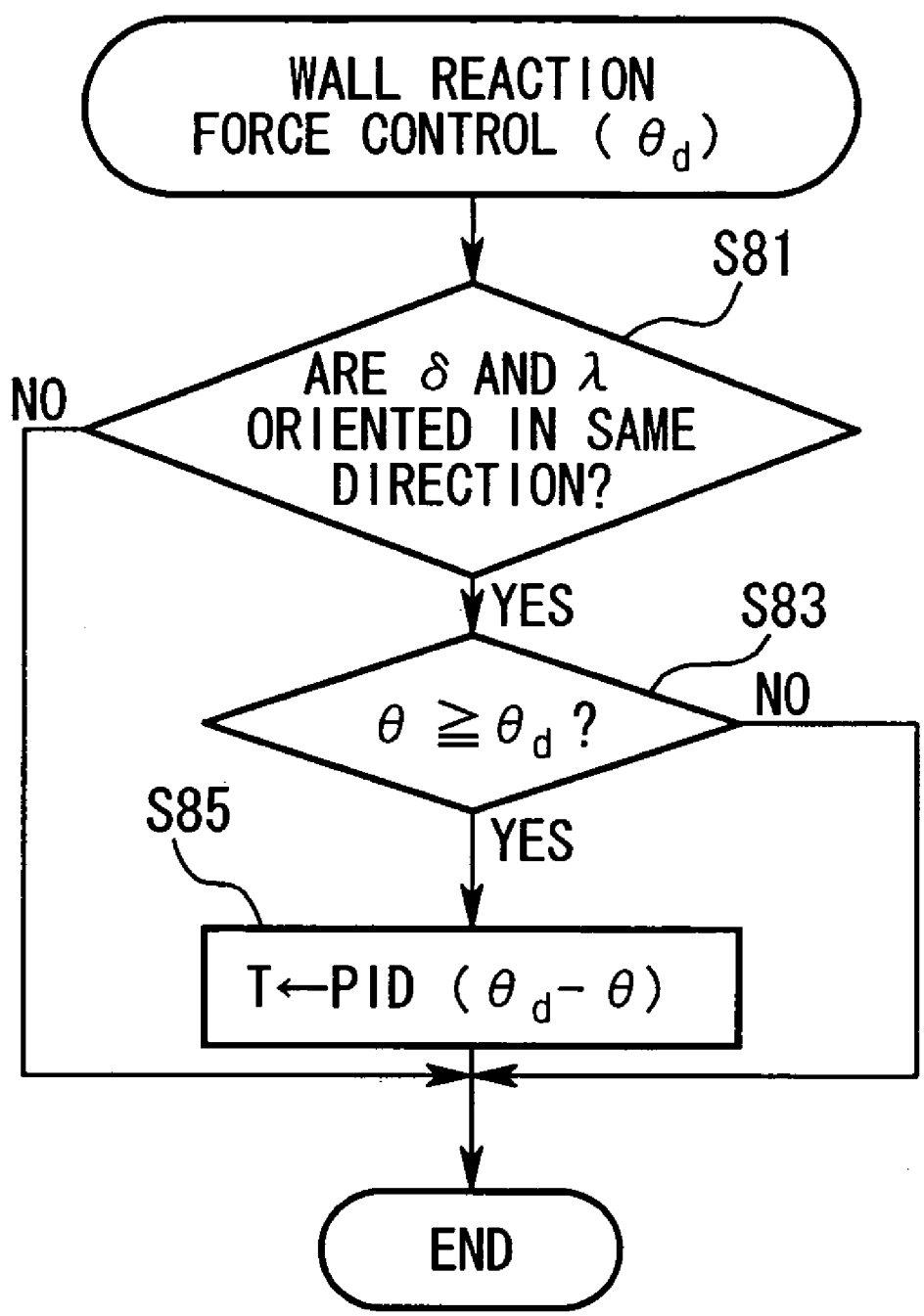
FIG. 7 is a flowchart showing the contents of a subroutine of step S67 in FIG. 6.

Next, using the flowcharts in FIG. 6 and FIG. 7, the contents of so-called controlled rack end variable processing are described in which the driver is allowed to continue steering the steering wheel 2 without the steering reaction force being built up until the actual turning angle reaches the maximum turning angle.

For the sake of convenience, the term "rack stroke" is used in place of the term "turning angle", as the two terms have the same connotation. In other words, the actual turning angle corresponds to the actual rack stroke, the target turning angle corresponds to the target rack stroke, and the maximum turning angle corresponds to the physical rack end position, respectively. Furthermore, the controlled rack stroke corresponds to the controlled steering end angle.

First, in step S1, a determination is made as to whether or not the actual steering angle θ of the steering wheel 2 is zero. If it is determined that the actual steering angle θ is zero (the result is "yes"), the flow proceeds to step S21, while if it is determined that the actual steering angle θ is not zero (the result is "no"), the flow proceeds to step S3.

In step S21, the steering gear ratio R being used is set to the initial setting steering gear ratio R0. Here, R0=θ/λ, where θ is the actual steering angle and λ is the actual rack stroke.

In the following step S23, a variable rack end implementation flag f is set to a value of "0", which indicates that the controlled rack end, or in other words the controlled steering end angle θd is still set to the initial setting.

In step S3, the target rack stroke λt is set to the result of dividing the actual steering angle θ by the steering gear ratio R being used.

In step S5, a determination is made as to whether or not the target rack stroke λt has reached the physical rack end position λe. If it is determined that the target rack stroke λt has not yet reached the physical rack end position λe (the result is "no"), the flow proceeds to step S11, while if it is determined that the target rack stroke λt has already reached the physical rack end position λe (the result is "yes"), the flow proceeds to step S7.

In the rack position control subroutine in step S11, feedback control is performed so that the actual rack stroke λ coincides with the target rack stroke λt.

In step S7, a determination is made as to whether or not the output of the steering motor 10 has reached the maximum output, based on a control command signal output from the steering motor control section 22. If it is determined that the output of the steering motor 10 has already reached the maximum output (the result is "yes"), that is, if the actual turning angle is not adequately tracking the target turning angle, the flow proceeds to step S9, while if it is determined that the output of the steering motor 10 has not yet reached the maximum output (the result is "no"), that is, the actual turning angle is adequately tracking the target turning angle, the flow proceeds to step S31.

In step S9, a determination is made as to whether or not the actual rack stroke λ has reached the physical rack end position λe. If it is determined that the actual rack stroke λ has not yet reached the physical rack end position λe (the result is "no"), the flow proceeds to step S11, and feedback control is performed so that the actual rack stroke λ coincides with the target rack stroke λt. On the other hand, if it is determined that the actual rack stroke λ has already reached the physical rack end position λe (the result is "yes"), the flow proceeds to step S51.

In step S51, a determination is made as to whether or not the variable rack end implementation flag f is set to "1", that is whether or not the controlled rack end has been changed and those changes kept. If it is determined that the controlled rack end has not been changed, or that the changed controlled rack end has reverted to the initial setting (the result is "no"), the flow proceeds to step S61, while if it is determined that the controlled rack end has been changed and those changes have been kept (the result is "yes"), the flow proceeds to step S65 without performing the controlled rack end changing processing (steps S61, S63) described below.

In step S61, the controlled steering end angle θd used in step S71 is set to the actual steering angle θ of the steering wheel 2, thereby changing the controlled steering end angle θd. Then in the following step S63, the variable rack end implementation flag f is set to "1" indicating that the controlled rack end, that is the controlled steering end angle θd, has been changed from the initial setting to a predetermined value.

These steps S61 and S63 constitute the controlled rack end changing processing, which is only implemented when the variable rack end implementation flag f has been changed from "0" to "1".

In step S65, a determination is made as to whether or not the steering torque δ detected by the steering torque sensor 5 and the actual rack stroke λ are oriented in the same direction, that is whether the steering direction of the steering wheel 2 and the turning direction of the wheels 6 are the same direction. If it is determined that the steering direction of the steering wheel 2 and the turning direction of the wheels 6 are the same direction (the result is "yes"), the flow proceeds to step S67, while if it is determined that the steering direction of the steering wheel 2 and the turning direction of the wheels 6 are opposite directions (the result is "no"), there is no need to perform the wall reaction force control in step S67, and so the flow proceeds to step S71.

In the wall reaction force control subroutine in step S67, as shown in the flowchart in FIG. 7, first in step S81, the same determination as in step S65, that is, a determination as to whether or not the steering torque δ and the actual rack stroke λ are oriented in the same direction, is made. If it is determined that the steering torque δ and the actual rack stroke λ are oriented in opposite directions (the result is "no"), the processing in steps S83 and S85 is skipped and the subroutine is terminated, while if it is determined that the steering torque δ and the actual rack stroke λ are oriented in the same direction (the result is "yes"), the flow proceeds to step S83.

In step S83, a determination is made as to whether or not the actual steering angle θ of the steering wheel 2 has reached the controlled steering end angle θd. If it is determined that the actual steering angle θ of the steering wheel 2 has already reached the controlled steering end angle θd (the result is "yes"), the flow proceeds to step S85, while if it is determined that the actual steering angle θ of the steering wheel 2 has not yet reached the controlled steering end angle θd (the result is "no"), the processing in step S85 is skipped, and the subroutine is terminated.

In step S85, a PID control calculated value, based on the result of subtracting the actual steering angle θ of the steering wheel 2 from the controlled steering end angle θd is set to an output indicator value T to the steering reaction force application motor 4.

In the gear ratio recalculation subroutine in step S71, the result of dividing the controlled steering end angle θd by the physical rack end position λe is set to the steering gear ratio R being used.

In step S31, which is performed when the result of the determination in step S7 is "no", that is, when the output of the steering motor 10 has not reached the maximum output, the same determination as in step S51 is made, that is, whether or not the variable rack end implementation flag f is set to "1" is determined.

If it is determined that the controlled rack end has been changed and those changes have been kept (the result is "yes"), the flow proceeds to step S9, while if it is determined that the controlled rack end has not been changed or has reverted to the initial setting (the result is "no"), the flow proceeds to step S41.

In step S41, the initial setting of the steering end angle θe is set to the controlled steering end angle θd, thereby restoring the controlled steering end angle θd to the initial setting.

In the following step S43, the same processing as in step S65 is performed, that is, a determination is made as to whether or not the steering torque δ and the actual rack stroke λ are oriented in the same direction. If it is determined that the steering torque δ and the actual rack stroke λ are oriented in the same direction (the result is "yes"), the flow proceeds to step S45, while if it is determined that the steering torque δ and the actual rack stroke λ are oriented in opposite directions (the result is "no"), there is no need to perform the wall reaction force control in step S67, and so the flow proceeds to step S11.

The contents of the wall reaction force control in step S45 and the rack position control in step S11 are as described above.

According to the steering device 1 of the present example as described above, steering reaction force is not rapidly built up at least until the actual rack stroke λ has reached the physical rack end position. Therefore the driver is allowed to continue to steer the steering wheel 2. As a result, when steering the steering wheel 2, the driver can continue to steer without being conscious of the tracking delay of the wheels 6, which improves the steering feel considerably.

If in this manner, the steering reaction force is not built up until the actual rack stroke $\lambda$ approaches the physical rack end position, then on the one hand improvement of the steering feel can be achieved. However in some cases the actual steering angle $\theta$ may equal or exceed the initial setting of the controlled steering end angle $\theta d$.

In such a case, if the setting of the target rack stroke $\lambda t$ is left unchanged after being determined, then when the driver performs a returning action of the steering wheel 2, a state where the wheels 6 do not turn persists for a brief while, which causes the driver to experience a feeling of unease.

However, according to the steering device 1 of the present example, the target rack stroke $\lambda t$ is changed according to the actual steering angle $\theta$ of the steering wheel 2. Therefore the wheels 6 can be turned without delay when the driver begins a returning action of the steering wheel 2.

Furthermore, in the steering device 1 of the present example, if the deviation between the actual rack stroke $\lambda$ and the target rack stroke $\lambda t$ is above a predetermined value, that is if the wheels 6 do not adequately track the target turning angle, then when the target rack stroke $\lambda t$ reaches the physical rack end position, a smaller steering reaction force than the steering reaction force applied by the wall reaction force control has already been applied preliminarily. Therefore, while steering the steering wheel 2, the driver can be made aware of the fact that the actual steering angle $\theta$ of the steering wheel 2 has reached the original controlled steering end angle $\theta d$.

As a result, needless increases in the amount of steering due to fast steering by the driver can be suppressed, and the rate of increase of the steering reaction force during wall reaction force control can also be suppressed.

The present invention is not limited to the example described above, and various design changes can be made thereto without departing from the spirit or scope of the invention.

For example, a configuration may be used in which the operation unit and the steerable wheels are connected mechanically via a clutch, and in normal circumstances, the connection with the clutch is severed and the operation unit and steerable wheels are not connected, but in extraordinary circumstances such as a malfunction, the clutch is connected, thereby providing a mechanical connection between the operation unit and the steerable wheels.

Furthermore, the build up of the steering reaction force is not limited to cases where the actual turning angle matches the maximum turning angle, and may be performed when the absolute value of the deviation thereof is below a predetermined value.

In the same manner, build up of the preliminary reaction force may be performed when the absolute value of the deviation between the target turning angle and the maximum turning angle is below a predetermined value. Moreover, the changing of the target turning angle according to the operation amount of the operation unit may be performed when the absolute value of the deviation between the actual turning angle and the target turning angle is below a predetermined value.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A steering device, comprising:
   an operation unit operable by a driver to steer steerable wheels;
   a target turning angle determination device which determines a target turning angle of said steerable wheels according to an operation amount of said operation unit;
   a turning angle measuring device which measures an actual turning angle of said steerable wheels;
   a turning actuator which turns said steerable wheels according to a deviation between said target turning angle and said actual turning angle;
   a reaction force determination device which determines a reaction force to apply to said operation unit; and
   a reaction force actuator which applies said reaction force,
   wherein a rate of increase of said reaction force
      remains unchanged when said target turning angle approaches a maximum turning angle during a period in which a deviation between said actual turning angle and said target turning angle is not less than a predetermined level, and
      is raised when said actual turning angle approaches the maximum turning angle.

2. A steering device according to claim 1, wherein said target turning angle is changed according to the operation amount of said operation unit when said actual turning angle approaches said maximum turning angle.

3. A steering device according to claim 1, wherein when said target turning angle approaches said maximum turning angle during a period in which a deviation between said actual turning angle and said target turning angle is not less than a predetermined level, a preliminary reaction force, which is smaller than a reaction force applied when said actual turning angle approaches said maximum angle, is applied to said operation unit.

4. A steering device according to claim 1, wherein when the direction of operation of the unit is reversed upon the condition of the actual turning angle approaching said maximum turning angle, said target turning angle is changed according to the actual steering angle.

5. A steering device according to claim 1, wherein
   upon operation of the operation unit, the reaction force actuator applies an initial reaction force to the operation unit, the initial reaction force being substantially constant over time for increasing actual turning angle, and
   when said target turning angle approaches said maximum turning angle during a period in which a deviation between said actual turning angle and target turning angle is not less than a predetermined level, a substantially constant preliminary reaction force is applied to said operation unit, the preliminary reaction force comprising a force which is greater than the initial reaction force, and which is smaller than a reaction force applied when said actual angle approaches said maximum turning angle.

6. A steering device according to claim 1, wherein the steering reaction force is maintained at a substantially constant level between the time when the target turning angle has reached said maximum turning angle and the time when the actual turning angle has reached said maximum turning angle.

7. A steering device according to claim 1, wherein the steering reaction force is maintained at s substantially constant level between the time when the target turning angle has reached said maximum turning angle and the time when the actual turning angle has reached said maximum turning angle, and when the actual angle reaches said maximum turning angle then said steering reaction force rapidly increases.

8. A method of controlling a steer-by-wire steering device, the steering device comprising:
- an operation unit operable by a driver to steer steerable wheels; a target turning angle determination device which determines a target turning angle of said steerable wheels according to an operation amount of said operation unit;
- a turning angle measuring device which measures an actual turning of said steerable wheels;
- a turning actuator which turns said steerable wheels according to a deviation between said target turning angle and said actual turning angle;
- a reaction force determination device which determines a reaction force to apply to said operation unit; and
- a reaction force actuator which applies said reaction force, wherein the steering device is controlled such that:
- when the difference between the actual turning angle and the target turning angle is less than a predetermined level, and when the target turning angle reaches a maximum turning angle, then the steering reaction force is rapidly increased; and
- when the difference between the actual turning angle and the target turning angle is greater than a predetermined level, and when the target turning reaches a maximum turning angle, then the steering reaction force remains substantially unchanged.

9. The method of claim 8, wherein the steering device is further controlled such that:
- when the difference between the actual turning angle and the target turning angle is greater than a predetermined level, and when the target turning reaches a maximum turning angle, then the steering reaction force remains substantially unchanged until the actual angle reaches the maximum turning angle, at which time the steering reaction force is rapidly increased.

10. The method of claim 8, wherein when the direction of the steering unit is reversed upon the condition of the actual turning angle approaching said maximum turning angle, said target turning angle is changed according to the actual steering angle.

11. The method of claim 8, wherein upon operation of the operation unit, the reaction force actuator applies an initial reaction force, and wherein when said target turning angle approaches said maximum turning angle during a period in which a deviation between said actual turning angle and said target turning angle is not less than a predetermined level, a preliminary reaction force is applied to said operation unit, the preliminary reaction force comprising a force which is greater than the initial reaction force, and which is smaller than a reaction force applied when said actual when said actual turning angle approaches said maximum turning angle.

12. A method of controlling a steer-by-wire steering device, the steering device comprising:
- an operation unit operable by a driver to steer steerable wheels;
- a target turning angle determination device which determines a target turning angle of said steerable wheels according to an operation amount of said operation unit;
- a turning angle measuring device which measures an actual turning angle of said steerable wheels;
- a turning actuator which turns said steerable wheels according to a deviation between said target turning angle and said actual turning angle;
- a reaction force determined device which determines a reaction force to apply to said operation unit; and
- a reaction force actuator which applies said reaction force, wherein the steering device is controlled such that:
- when the operation unit is operated by the driver, the reaction force actuator applies an initial steering reaction force to the operation unit, the initial steering reaction force being substantially constant over time for an increasing actual turning angle;
- when the difference between the actual turning angle and the target turning angle is less than a predetermined level, and when the target turning angle reaches a maximum turning angle, then the steering reaction force is rapidly increased; and
- when the difference between the actual turning angle and the target turning angle is greater that a predetermined level, and when the target angle turning reaches the maximum turning angle, then the steering reaction force is increased to a level of force which is greater than the initial steering reaction force and substantially maintained at that force level unit the actual turning angle reaches the maximum turning angle, at which time the steering reaction force is rapidly increased.

* * * * *